United States Patent
Park et al.

(10) Patent No.: US 10,693,133 B2
(45) Date of Patent: Jun. 23, 2020

(54) METHOD OF MANUFACTURING POSITIVE MATERIAL

(71) Applicant: SAMSUNG SDI CO., LTD., Yongin-si, Gyeonggi-do (KR)

(72) Inventors: YoungJin Park, Yongin-si (KR); DoHyung Park, Yongin-si (KR); MinHan Kim, Yongin-si (KR); DongJin Kim, Yongin-si (KR); KyoungHyun Kim, Yongin-si (KR); IlSeok Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 16/435,299

(22) Filed: Jun. 7, 2019

(65) Prior Publication Data

US 2019/0296339 A1 Sep. 26, 2019

Related U.S. Application Data

(62) Division of application No. 15/384,448, filed on Dec. 20, 2016, now abandoned.

(30) Foreign Application Priority Data

Dec. 22, 2015 (KR) .................. 10-2015-0184126

(51) Int. Cl.
*H01M 4/36* (2006.01)
*B01J 13/02* (2006.01)
(Continued)

(52) U.S. Cl.
CPC ............. *H01M 4/366* (2013.01); *B01J 13/02* (2013.01); *H01M 4/136* (2013.01); *H01M 4/1315* (2013.01); *H01M 4/485* (2013.01); *H01M 4/505* (2013.01); *H01M 4/5825* (2013.01); *H01M 4/623* (2013.01); *H01M 4/625* (2013.01); *H01M 10/0422* (2013.01); *H01M 10/0431* (2013.01); *H01M 10/0525* (2013.01); *H01M 10/0561* (2013.01); *H01M 10/0569* (2013.01);
(Continued)

(58) Field of Classification Search
CPC ...... H01M 4/366; H01M 4/625; H01M 4/136; H01M 4/1315; H01M 4/485; H01M 4/505; H01M 4/5825; H01M 4/623; H01M 10/0587; H01M 10/0422; H01M 10/0431; H01M 10/0525; H01M 10/0561; H01M 10/0569; H01M 2300/004; H01M 2220/30; B01J 13/02
USPC ........................................................ 429/94
See application file for complete search history.

(56) References Cited

U.S. PATENT DOCUMENTS 7,459,238 B2 12/2008 Takahashi et al.
7,695,649 B2 4/2010 Paulsen et al.
(Continued)

FOREIGN PATENT DOCUMENTS

JP 2001-273898 A 10/2001
JP 2004-014296 A 1/2004
(Continued)

*Primary Examiner* — Gary D Harris
(74) *Attorney, Agent, or Firm* — Lee IP Law, PC

(57) ABSTRACT

A positive active material including a core including a compound capable of reversibly intercalating and deintercalating lithium and $LiNaSO_4$ that is coated on at least a part of a surface of the core or that blends with the core.

6 Claims, 4 Drawing Sheets

(51) Int. Cl.
*H01M 4/1315* (2010.01)
*H01M 4/136* (2010.01)
*H01M 4/485* (2010.01)
*H01M 4/505* (2010.01)
*H01M 4/58* (2010.01)
*H01M 4/62* (2006.01)
*H01M 10/04* (2006.01)
*H01M 10/0525* (2010.01)
*H01M 10/0561* (2010.01)
*H01M 10/0569* (2010.01)
*H01M 10/0587* (2010.01)

(52) U.S. Cl.
CPC .... *H01M 10/0587* (2013.01); *H01M 2220/30* (2013.01); *H01M 2300/004* (2013.01)

(56) References Cited

U.S. PATENT DOCUMENTS

| | | | |
|---|---|---|---|
| 2003/0044684 A1* | 3/2003 | Nanannoto | H01M 4/133 429/231.1 |
| 2006/0105239 A1 | 5/2006 | Paulsen et al. | |
| 2016/0365571 A1 | 12/2016 | Kim et al. | |

FOREIGN PATENT DOCUMENTS

| | | |
|---|---|---|
| JP | 2005-108448 A | 4/2005 |
| KR | 10-0809847 B1 | 3/2008 |

\* cited by examiner

METHOD OF MANUFACTURING POSITIVE MATERIAL

CROSS-REFERENCE TO RELATED APPLICATIONS

This is a divisional application based on pending application Ser. No. 15/384,448, filed Dec. 20, 2016, the entire contents of which is hereby incorporated by reference.

Korean Patent Application No. 10-2015-0184126, filed on Dec. 22, 2015, in the Korean Intellectual Property Office, and entitled: "Positive Active Material, Lithium Battery Including the Same, and Method of Manufacturing the Positive Active Material," is incorporated by reference herein in its entirety.

BACKGROUND

1. Field

Embodiments relate to a positive active material, a lithium battery including the positive active material, and a method of manufacturing the positive active material.

2. Description of the Related Art

With the development of small high-tech devices such as digital cameras, mobile devices, laptops, and computers, the demand for a lithium secondary battery as an energy source has rapidly increased. In addition, with the spread of the use of a lithium secondary battery from portable information electronic devices to the industries of electric tools or vehicles, the demand for a lithium secondary battery with high capacity, high output, and safety has further increased.

SUMMARY

Embodiments are directed to a positive active material including a core including a compound capable of reversibly intercalating and deintercalating lithium and $LiNaSO_4$ that is coated on at least a part of a surface of the core or that blends with the core.

The $LiNaSO_4$ may be attached on the core in a layered form or an island form.

An amount of the core may be in a range of about 95 wt % to about 99.5 wt %. An amount of the $LiNaSO_4$ may be in a range of about 0.5 wt % to about 5 wt %, of a total weight of the core and the $LiNaSO_4$.

An amount of the core may be in a range of about 97 wt % to about 99.3 wt % of a total weight of the core and the $LiNaSO_4$. An amount of the $LiNaSO_4$ may be in a range of about 0.7 wt % to about 3 wt % of a total weight of the core and the $LiNaSO_4$.

The core may include at least one selected from compounds represented by Formulae 1 to 3:

$$Li_a(Ni_xM'_y)O_2 \quad \text{[Formula 1]}$$

wherein, in Formula 1, M' is at least one element selected from Co, Mn, Fe, V, Cu, Cr, Al, Mg, and Ti; and $0.9 < a \leq 1.1$, $0 \leq x < 0.4$, $0.6 \leq y \leq 1$, and $x+y=1$, $$LiMPO_4 \quad \text{[Formula 2]}$$

wherein, in Formula 2, M is at least one element selected from Fe, Mn, Ni, Co, and V, $$Li_{1+y}Mn_{2-y-z}M_zO_{4-x}Q_x \quad \text{[Formula 3]}$$

wherein, in Formula 3, M is at least one element selected from Mg, Al, Ni, Co, Fe, Cr, Cu, B, Ca, Nb, Mo, Sr, Sb, W, B, Ti, V, Zr, and Zn; Q is at least one element selected from N, F, S, and Cl; and $0 \leq x \leq 1$, $0 \leq y \leq 0.34$, and $0 \leq z \leq 1$.

The core may include the compound represented by Formula 1. The compound represented by Formula 1 may be further substituted or doped with at least one element selected from Ca, Mg, Al, Ti, Sr, Fe, Co, Cu, Zn, Y, Zr, Nb, and B, wherein the substituted or doped one element is different from Ni and M'.

Embodiments are also directed to a lithium battery including a positive electrode including the positive active material as described above, a negative electrode facing the positive electrode, and an electrolyte between the positive electrode and the negative electrode.

The lithium battery may operate within a voltage range of about 4.3 V to about 4.6 V.

Embodiments are also directed to a method of manufacturing a positive active material including preparing a compound capable of reversibly intercalating and deintercalating lithium, adding and mixing a sodium source and a sulfate source to the compound to obtain a powder mixture, and heat-treating the powder mixture to obtain a positive active material including $LiNaSO_4$ that is coated on at least a part of a surface of the compound capable of reversibly intercalating and deintercalating lithium or that blends with the compound capable of reversibly intercalating and deintercalating lithium.

The sodium source may include at least one selected from sodium dodecyl sulfate ($CH_3(CH_2)_{11}SO_4Na$), sodium sulfate ($Na_2SO_4$), sodium nitrate ($NaNO_3$), sodium acetate ($CH_3COONa$), sodium carbonate ($Na_2Co_3$), sodium bicarbonate ($NaHCO_3$), and sodium hydroxide ($NaOH$).

The sulfate source may include at least one selected from sodium dodecyl sulfate ($CH_3(CH_2)_{11}SO_4Na$), sodium sulfate ($Na_2SO_4$), sulfuric acid ($H_2SO_4$), ammonium sulfate (($NH_4)_2SO_4$), and lithium sulfate ($Li_2SO_4$).

The heat-treating may be performed at a temperature in a range of about 600° C. to about 1,000° C.

An amount of the compound capable of intercalating and deintercalating lithium may be in a range of about 95 wt % to about 99.5 wt % of a total weight of the compound capable of intercalating and deintercalating lithium and the $LiNaSO_4$. An amount of the $LiNaSO_4$ may be in a range of about 0.5 wt % to about 5 wt %, of the total weight of the compound capable of intercalating and deintercalating lithium and the $LiNaSO_4$.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
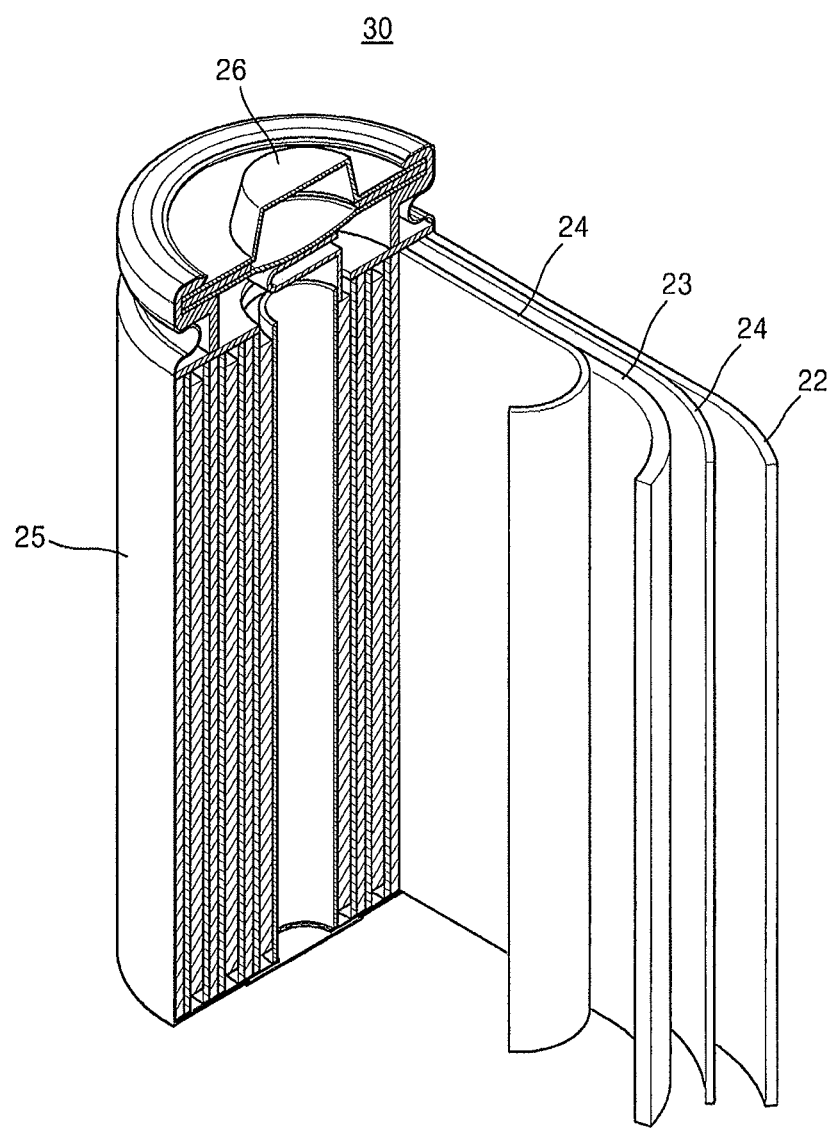
FIG. 1 illustrates a cutaway and partially exploded schematic view of a structure of a lithium battery according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

According to an embodiment, a positive active material may include a core including a compound capable of reversibly intercalating and deintercalating lithium, and $LiNaSO_4$ coated on or blended with the core.

The core may be a suitable compound that is capable of reversibly intercalating and deintercalating lithium. For example, the compound may be represented by $Li_aA_{1-b}X_bD_2$ (where $0.90 \le a \le 1.8$ and $0 \le b \le 0.5$); $Li_aA_{1-b}X_bO_{2-c}D_c$ (where $0.90 \le a \le 1.8$, $0 \le b \le 0.5$, and $0 \le c \le 0.05$); $LiE_{2-b}X_bO_{4-c}D_c$ (where $0 \le b \le 0.5$ and $0 \le c \le 0.05$); $Li_aNi_{1-b-c}Co_bX_cD_\alpha$ (where $0.90 \le a \le 1.8$, $0 \le b \le 0.5$, $0 \le c \le 0.05$, and $0 \le \alpha \le 2$); $Li_aNi_{1-b-c}Co_bX_cO_{2-\alpha}T_\alpha$ (where $0.90 \le a \le 1.8$, $0 \le b \le 0.5$, $0 \le c \le 0.05$, and $0 \le \alpha \le 2$); $Li_aNi_{1-b-c}Co_bX_cO_{2-\alpha}T_2$ ($0.90 \le a \le 1.8$, $0 \le b \le 0.5$, $0 \le c \le 0.05$, and $0 \le \alpha \le 2$); $Li_aNi_{1-b-c}Mn_bX_cD_\alpha$ (where $0.90 \le a \le 1.8$, $0 \le b \le 0.5$, $0 \le c \le 0.05$, and $0 \le \alpha \le 2$); $Li_aNi_{1-b-c}Mn_bX_cO_{2-\alpha}T_\alpha$ (where $0.90 \le a \le 1.8$, $0 \le b \le 0.5$, $0 \le c \le 0.05$, and $0 \le \alpha \le 2$); $Li_aNi_{1-b-c}Mn_bX_cO_{2-\alpha}T_2$ (where $0.90 \le a \le 1.8$, $0 \le b \le 0.5$, $0 \le c \le 0.05$, and $0 \le \alpha \le 2$); $Li_aN i_bE_cG_dO_2$ (where $0.90 \le a \le 1.8$, $0 \le b \le 0.9$, $\le c \le 0.5$, and $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$ and $0.001 \le b \le 0.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2GbO_4$ (where $0.90 \le a \le 1.8$ and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); or $LiFePO_4$.

In the above formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

In an embodiment, the core may include at least one of compounds represented by Formulae 1 to 3:

$Li_a(Ni_xM'_y)O_2$ [Formula 1]

In Formula 1, M' is at least one element selected from Co, Mn, Fe, V, Cu, Cr, Al, Mg, and Ti; and $0.9 < a \le 1.1$, $0 \le x < 0.4$, $0.6 \le y \le 1$, and $x+y=1$

$LiMPO_4$ [Formula 2]

In Formula 2, M is at least one element selected from Fe, Mn, Ni, Co, and V

$Li_{1+y}Mn_{2-y-z}M_zO_{4-x}Q_x$ [Formula 3]

In Formula 3, M is at least one element selected from Mg, Al, Ni, Co, Fe, Cr, Cu, B, Ca, Nb, Mo, Sr, Sb, W, B, Ti, V, Zr, and Zn, Q is at least one element selected from N, F, S, and Cl, and $0 \le x \le 1$, $0 \le y \le 0.34$, and $0 \le z \le 1$.

The compound represented by Formula 1 may be further substituted or doped with at least one element selected from Ca, Mg, Al, Ti, Sr, Fe, Co, Cu, Zn, Y, Zr, Nb, and B, wherein the substituted or doped element is different from Ni and M'.

The core may be in a form of a one-body particle. Herein, the term "one-body particle" indicates a particle that is different from an agglomerate in which small particles are clustered together. The one-body particle may be formed of one particle that exists alone without having a grain boundary in the particle. The specific surface area of the core formed of the one-body particle may be less than a core formed from an aggregate. The core in the form of a one-body particle may suppress side reactions with an electrolyte.

In some implementations, the core may be a secondary particle that is formed by agglomerating primary particles. The secondary particle may include gaps and boundaries between the primary particles. The secondary particle may provide high capacity due to an increase in a specific surface area.

The core may have a suitable average particle diameter. For example, when the average particle diameter of the core is not too small, excessive reactivity with an electrolyte solution that may deteriorate cycle characteristics may be avoided. When the average particle diameter of the core is not too large, a deterioration of dispersion stability in the formation of a positive electrode slurry may be avoided, and a rough surface of a positive electrode may be avoided. An average particle diameter D50 of the core may be about 50 µm or less, or, for example, in a range of about 1 µm to about 30 µm, or, for example, about 5 µm to about 25 µm, or, for example, about 10 µm to about 20 µm.

As used herein, the term "average particle diameter (D50)" refers to a cumulative average particle diameter that corresponds to 50 vol % in a cumulative distribution curve of a particle diameter having the total volume as 100%. The average particle diameter (D50) may be measured by using a method known in the art. An example of the method may include measuring by a particle size analyzer or measuring from a TEM or SEM image. In some embodiments, the method may include measuring with a meter by dynamic light-scattering, performing data analysis to count the number of particles with respect to each size range, and obtaining D50 from the resulting calculation.

The positive active material may be prepared by coating $LiNaSO_4$ onto at least a part of a surface of the core including the compound capable of reversibly intercalating or deintercalating lithium or by blending the core with $LiNaSO_4$.

$LiNaSO_4$ may facilitate the conduction of lithium ions, may help suppress a reaction between a positive active material core capable of intercalating or deintercalating lithium ions and an electrolyte solution, and may help improve lifespan characteristics of the lithium battery.

The $LiNaSO_4$ may be formed, for example, when a sodium source and a sulfate source react with a lithium source that is present in the compound capable of reversibly intercalating and deintercalating lithium. Thus, the $LiNaSO_4$ may be coated on or blend with a surface of the compound capable of reversibly intercalating and deintercalating lithium.

In one embodiment, the $LiNaSO_4$ may be coated onto a surface of the core. The $LiNaSO_4$ may be coated in a layered structure or in an island shape. Herein, the term "island shape" refers to a shape that is discontinuously attached to the surface of the core. For example, an island shape may be a semispherical, non-spherical, or irregular shape having a volume.

In the positive active material, an amount of the core may be in a range of about 95 wt % to about 99.5 wt % of a total weight of the core and the $LiNaSO_4$, and an amount of the $LiNaSO_4$ may be in a range of about 0.5 wt % to about 5 wt % of the total weight of the core and the $LiNaSO_4$. For example, in the positive active material, an amount of the core may be in a range of about 97 wt % to about 99.3 wt % of the total weight of the core and the $LiNaSO_4$, and an amount of the $LiNaSO_4$ may be in a range of about 0.7 wt % to about 3 wt % of the total weight of the core and the $LiNaSO_4$. When the amounts of the core and the $LiNaSO_4$ are within these ranges, side reactions between the core and an electrolyte may be effectively suppressed and lifespan characteristics of a lithium battery may be improved.

The positive active material according to an embodiment may be used in the manufacture of a lithium battery having excellent cycle characteristics by coating or blending of $LiNaSO_4$, which has lithium ion conductivity.

According to an embodiment, a method of manufacturing a positive active material is provided.

The method of manufacturing a positive active material may include preparing a compound capable of reversibly intercalating and deintercalating lithium, adding and mixing a sodium source and a sulfate source to the compound to obtain a powder mixture, and heat-treating the powder mixture to obtain a positive active material that is coated on or blends with at least a part of a surface of the compound capable of reversibly intercalating and deintercalating lithium.

The compound capable of reversibly intercalating and deintercalating lithium is the same as defined in the description above. The compound may be at least one selected from compounds provided as examples.

A suitable solvent may be used in the solution. Examples of the solvent include water, ethanol, hexane, a heptane, isopropanol, and N-methylpyrrolidone (NMP).

The sodium source and the sulfate source are raw materials that may be used to form $LiNaSO_4$. The sodium source and the sulfate source may react with an excessive amount of lithium existing on a surface of the compound capable of reversibly intercalating and deintercalating lithium to form $LiNaSO_4$.

The sodium source may be a salt including sodium (Na). Examples of the sodium source may include sodium dodecyl sulfate ($CH_3(CH_2)_{11}SO_4Na$), sodium sulfate ($Na_2SO_4$), sodium nitrate ($NaNO_3$), sodium acetate ($CH_3COONa$), sodium carbonate ($Na_2CO_3$), sodium hydrogen carbonate ($NaHCO_3$), and sodium hydroxide (NaOH). At least one selected therefrom may be used.

Examples of the sulfate source may include sodium dodecyl sulfate ($CH_3(CH_2)_{11}SO_4Na$), sodium sulfate ($Na_2SO_4$), sulfuric acid ($H_2SO_4$), ammonium sulfate (($NH_4)_2SO_4$), and lithium sulfate ($Li_2SO_4$). At least one selected therefrom may be used.

In an implementation, compounds such as sodium dodecyl sulfate and sodium sulfate may serve as both the sodium source and the sulfate source.

The sodium source and the sulfate source may be added in desired amounts by taking into account a stoichiometry ratio in a solution including the compound capable of reversibly intercalating and deintercalating lithium.

The mixed solution may be heat-treated to obtain a positive active material having $LiNaSO_4$ that is coated on at least a part of a surface of the compound capable of reversibly intercalating and deintercalating lithium or that blends with the compound capable of reversibly intercalating and deintercalating lithium.

The heat-treating process may be performed in air at a temperature of about 600° C. to about 1,000° C. For example, the heat-treating process may be performed at a temperature in a range of about 700° C. to about 900° C. for about 4 hours to about 20 hours.

Before heat-treating the mixed solution, the method may further include evaporating the solvent from the mixed solution. When the solvent is evaporated from the mixed solution, a gel may be obtained. The gel may be heat-treated to obtain a positive active material that is coated or blended with $LiNaSO_4$.

A lithium battery may include a positive electrode including the positive active material, a negative electrode facing the positive electrode, and an electrolyte between the positive electrode and the negative electrode.

The positive electrode includes the positive active material. The positive electrode may be manufactured by, for example, mixing the positive active material, a conducting agent, and a binder in a solvent to prepare a positive active material composition, and molding the positive active material composition to have a predetermined shape or by coating a current collector such as a copper foil with the positive active material composition.

The conducting agent included in the positive active material composition may increase an electrical conductivity by providing a conduction pathway to the positive active material. Examples of the conducting agent may include a carbon-based material such as carbon black, acetylene black, Ketjen black, or carbon fiber (e.g., vapor growth carbon fiber); a metal-based material such as a metal powder or metal fiber of copper, nickel, aluminum, or silver; a conductive polymer such as a polyphenylene derivative; or a conducting material including a mixture thereof. An amount of the conducting agent may be appropriately controlled. For example, a weight ratio of the positive active material and the conducting agent may be in a range of about 99:1 to about 90:10.

The binder included in the positive active material composition contributes in binding of the positive active material and the conducting agent and binding of the positive active material to the current collector. An amount of the binder may be in a range of about 1 part to about 50 parts by weight based on 100 parts by weight of the positive active material. For example, an amount of the binder may be in a range of about 1 part to about 30 parts by weight, for example, about 1 part to about 20 parts by weight, or about 1 part to about 15 parts by weight, based on 100 parts by weight of the positive active material. Examples of the binder may include polymers such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, or a combination thereof.

Examples of the solvent may include NMP, acetone, or water. An amount of the solvent may be in a range of about 1 part to about 100 parts by weight based on 100 parts by weight of the positive active material. When the amount of the solvent is within this range, an active material layer may be easily formed.

A thickness of the current collector may be in a range of about 3 μm to about 500 μm. A current collectors that does not cause a chemical change to a battery and has high conductivity may be used. Examples of the current collector for a positive electrode may include stainless steel, aluminum, nickel, titanium, calcined carbon, and copper and stainless steel that are surface-treated with carbon, nickel, titanium, or silver. The current collector for a positive electrode may have an uneven micro structure at its surface to enhance a binding force with the positive active material. The current collector may be in various forms including a film, a sheet, a foil, a net, a porous body, a foaming body, or a non-woven body.

The positive active material composition may be directly coated onto a current collector. In some implementations, the positive active material composition may be cast onto a separate support to form a positive active material film, which may then be separated from the support and laminated on a copper foil current collector to prepare a positive electrode plate.

The positive active material composition may be printed onto a flexible electrode substrate to manufacture a printable battery, in addition to the use in manufacturing a lithium battery.

For the manufacture of a negative electrode, a negative active material composition may be prepared by mixing a negative active material, a binder, a solvent, and, optionally, a conducting agent.

Examples of the negative active material may include lithium metal, a metal that is alloyable with lithium, a transition metal oxide, a compound capable of doping and de-doping lithium, and a compound capable of reversibly intercalating and deintercalating lithium ions.

Examples of the transition metal oxide may include a tungsten oxide, a molybdenum oxide, a titanium oxide, a lithium titanium oxide, a vanadium oxide, and a lithium vanadium oxide.

Examples of the compound capable of doping and de-doping lithium may include Si; SiO$_x$ (where 0<x<2); a Si—Y' alloy (where Y' is an alkali metal, an alkali earth metal, a Group 13 element, a Group 14 element, a Group 15 element, a Group 16 element, a transition metal, a rare-earth element, or a combination thereof, but not Si); Sn; SnO$_2$; and a Sn—Y" alloy (where Y" is an alkali metal, an alkali earth metal, a Group 13 element, a Group 14 element, a Group 15 element, a Group 16 element, a transition metal, a rare-earth element, or a combination thereof, but not Sn). Also, at least one of the materials capable of doping and de-doping lithium may be used in combination with SiO$_2$. The element Y' or Y" may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The compound capable of reversibly intercalating and deintercalating lithium ions may be any one of various carbon-based materials that are generally used in a lithium battery. Examples of the compound capable of reversibly intercalating and deintercalating lithium ions may include crystalline carbon, amorphous carbon, and a mixture thereof. Examples of the crystalline carbon may include natural graphite and artificial graphite, each of which may have an amorphous shape, a plate shape, a flake shape, a spherical shape, or a fiber shape. Examples of the amorphous carbon may include soft carbon (low-temperature calcined carbon), hard carbon, meso-phase pitch carbide, and calcined cokes.

The conducting agent, the binder, and the solvent included in preparing the negative active material composition may be the same as those included in the positive active material composition. In some implementations, a plasticizer may be further added to the positive active material composition and to the negative active material composition in order to form pores in a corresponding electrode plate. Amounts of the negative active material, the conducting agent, the binder, and the solvent may be at the same levels used in a conventional lithium battery.

A negative electrode current collector may have a thickness of about 3 μm to about 500 μm. A current collectors that does not cause a chemical change to a battery and has high conductivity may be used as the negative electrode current collector. Examples of the current collector for a negative electrode may include stainless steel, aluminum, nickel, titanium, calcined carbon, and aluminum and stainless steel that are surface-treated with carbon, nickel, titanium, or silver. The current collector for a negative electrode may have an uneven micro structure at its surface to enhance a binding force with the negative active material. The current collector may be used in various forms including a film, a sheet, a foil, a net, a porous body, a foaming body, a non-woven body.

The negative active material thus prepared may be directly coated onto the current collector for a negative electrode to form a negative electrode plate, or may be cast onto a separate support, and a negative active material film separated from the support may be laminated onto the current collector for a negative electrode.

The positive electrode and the negative electrode may be separated by a suitable separator for use in a lithium battery. The separator may include a material that has a low resistance to the migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter in a range of about 0.01 μm to about 10 μm, and a thickness in a range of about 5 μm to about 300 μm.

A lithium salt-containing non-aqueous based electrolyte solution may include a non-aqueous electrolyte and a lithium salt. Examples of the non-aqueous electrolyte may include a non-aqueous electrolyte solution, a solid electrolyte, and an inorganic solid electrolyte.

The non-aqueous electrolyte solution may be a non-aprotic organic solvent. Examples of the non-aprotic organic solvent may include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte may include nitrides, halides, and sulfates of lithium such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$.

The lithium salt may be a suitable lithium salt for use in a lithium battery and that is soluble in the lithium salt-containing non-aqueous electrolyte. For example, the lithium salt may include at least one selected from LiCl, LiBr, LiI, LiClO$_4$, LiBF$_4$, LiB$_{10}$C$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenyl borate, and lithium imide.

Lithium batteries may be classified as lithium ion batteries, lithium ion polymer batteries, and lithium polymer batteries according to the type of separator and electrolyte used therein. In addition, lithium batteries may be classified as a cylindrical type, a rectangular type, a coin type, and a pouch type according to a battery shape, and may also be classified as a bulk type and a thin type according to a battery size. Lithium batteries may be also used either as primary lithium batteries or secondary lithium batteries.

FIG. 1 illustrates a cutaway and partially exploded schematic view of a typical structure of a lithium battery 30 according to an embodiment.

Referring to FIG. 1, the lithium battery 30 may include a positive electrode 23, a negative electrode 22, and a separator 24 between the positive electrode 23 and the negative electrode 22. The positive electrode 23, the negative electrode 22, and the separator 24 may be wound or folded, and then accommodated in a battery case 25. Subsequently, an electrolyte may be injected into the battery case 25, and the battery case 25 may be sealed by a sealing member 26, thereby completing the manufacture of the lithium battery 30. The battery case 25 may have a cylindrical shape, a rectangular shape, or a thin-film shape. The lithium battery 30 may be a lithium ion battery.

The lithium battery may be used as a power source for small-sized devices such as mobile phones or portable computers, or as a unit battery of a battery module including a plurality of batteries for use in a medium-to-large-sized device.

Examples of the medium-to-large-sized device may include a power tool; an xEV such as an electric vehicle (EV), a hybrid electric vehicle (HEV), and a plug-in hybrid electric vehicle; an electric bicycle such as E-bike or E-scooter; an electric golf cart; an electric truck; an electric commercial vehicle; or an electric power storage system. The lithium battery may be suitable for a use that requires a high output, a high voltage, and high temperature operability. The lithium battery may be used in applications that require a high voltage range of about 4.3 V to about 4.6 V.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

(1) Preparation of Positive Active Material

LiCoO$_2$ to be used as a core of a positive active material was prepared as follows.

First, Li$_2$CO$_3$ and Co$_3$O$_4$ were mixed so that a molar ratio of Li:Co was 1.03:1. The mixture was calcined at 1,000° C. in an air atmosphere for 10 hours to obtain LiCoO$_2$. The calcined LiCoO$_2$ was pulverized and classified using a sieve to prepare a LiCoO$_2$ powder having an average particle diameter of about 15 µm.

In order to coat LiNaSO$_4$ on the LiCoO$_2$ powder, 0.5 g of Na$_2$SO$_4$ was added to 100 g of the LiCoO$_2$ powder and mixed to prepare a powder mixture.

The powder mixture thus obtained was heat-treated at 800° C. in an air atmosphere for 10 hours to obtain a positive active material having 0.5 wt % of LiNaSO$_4$ coated on a surface of LiCoO$_2$.

(2) Preparation of Lithium Battery 94 wt % of the positive active material prepared as described above, 3 wt % of carbon black, as a conducting agent, and 3 wt % of PVDF, as a binder, were dispersed in N-methyl-2-pyrrolidone (NMP) to prepare a positive electrode slurry. The positive electrode slurry was coated onto an aluminum (Al) foil having a thickness in a range of about 20 µm to about 30 µm, to serve as a positive electrode current collector, and the coated positive electrode slurry was dried. The resultant was roll-pressed to prepare a positive electrode.

Lithium metal was used as a counter electrode (a negative electrode) of the positive electrode. An electrolyte was prepared by adding 1.1 M LiPF$_6$ to a solvent. The solvent was prepared by mixing ethylene carbonate (EC), ethylmethyl carbonate (EMC), and dimethyl carbonate (DMC) at a volume ratio of 3:5:2.

A separator formed of a porous polyethylene (PE) film was disposed between the positive electrode and the negative electrode to form a battery assembly. The battery assembly was rolled and pressed to be accommodated in a battery case. Then, the electrolyte was injected into the battery case to prepare a lithium battery (a coin half cell, 2016 type).

Example 2

A positive active material and a lithium battery were prepared in the same manner as in Example 1, except that a positive active material having 0.7 wt % of LiNaSO$_4$ coated on a surface of LiCoO$_2$ was prepared by adding and mixing 0.7 g of Na$_2$SO$_4$ to 100 g of a LiCoO$_2$ powder and heat-treating the mixture.

Example 3

A positive active material and a lithium battery were prepared in the same manner as in Example 1, except that the positive active material having 1.5 wt % of LiNaSO$_4$ coated on a surface of LiCoO$_2$ was prepared by adding and mixing 1.5 g of Na$_2$SO$_4$ to 100 g of a LiCoO$_2$ powder and heat-treating the mixture.

Example 4

A positive active material and a lithium battery were prepared in the same manner as in Example 1, except that the positive active material having 2.9 wt % of LiNaSO$_4$ coated on a surface of LiCoO$_2$ was prepared by adding and mixing 2.9 g of Na$_2$SO$_4$ to 100 g of a LiCoO$_2$ powder and heat-treating the mixture.

Comparative Example 1

A lithium battery was prepared in the same manner as in Example 1, except that the LiCoO$_2$ powder prepared in Example 1 itself without a coating process was used as a positive active material.

Comparative Example 2

A positive active material and a lithium battery were prepared in the same manner as in Example 1, except that the positive active material having 0.2 wt % of LiNaSO$_4$ coated on a surface of LiCoO$_2$ was prepared by adding and mixing 0.2 g of Na$_2$SO$_4$ to 100 g of a LiCoO$_2$ powder and heat-treating the mixture.

Evaluation Example 1: X-Ray Diffraction (XRD) Analysis of LiNaSO$_4$

Figure 2A:
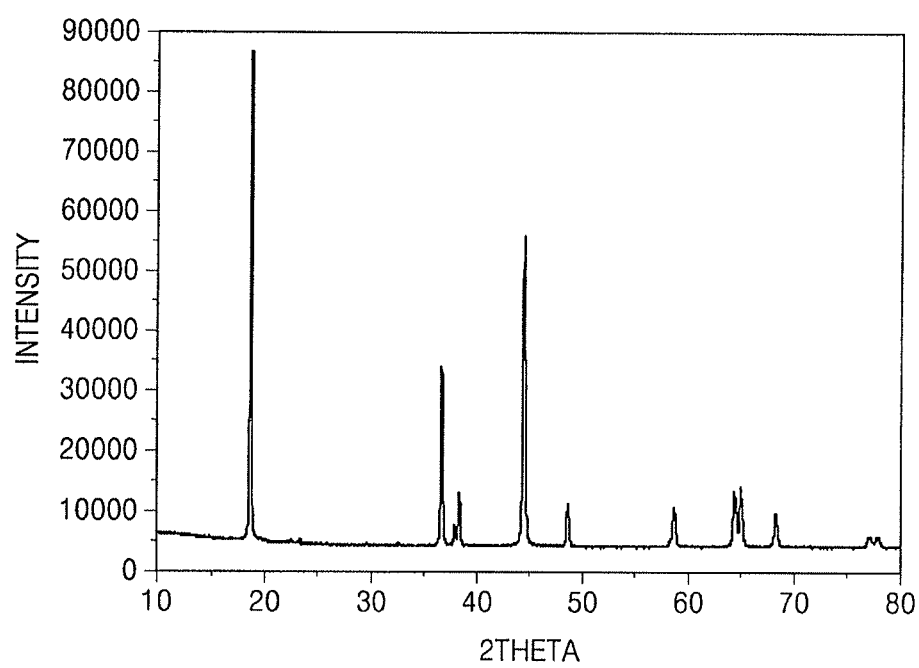
FIG. 2A illustrates the results of an XRD analysis performed on a positive active material prepared in Example 1.
Figure 2B:
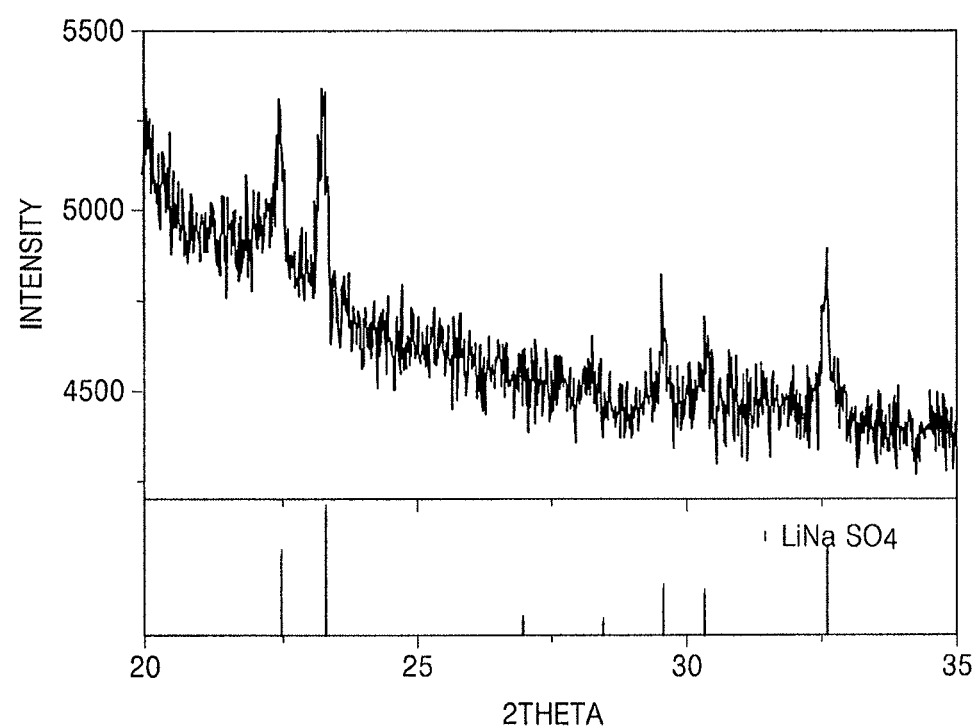
FIG. 2B illustrates an enlarged portion of 20° to 35° 2θ taken from the graph shown in FIG. 2A showing the presence of a $LiNaSO_4$ phase.

XRD analysis using an X-ray diffractometer (X'pert PRO MPD, available from PANalytical) was performed on the positive active material prepared in Example 1, and the results of the analysis are shown in FIGS. 2A and 2B. The analysis conditions included a CuK-alpha characteristic X-ray wavelength of 1.541 Å.

As shown in FIG. 2A, the positive active material prepared in Example 1 mainly showed an LCO phase. FIG. 2B is an enlarged view of a portion of 20° to 35° 2θ in the XRD graph of FIG. 2A, where a particular peak representing a LiNaSO$_4$ phase was evident within a range of 20° to 35°. Thus, it may be confirmed that the LiNaSO$_4$ phase was formed on a surface of the LCO.

Evaluation Example 2: Lifespan Characteristics Evaluation

The lithium batteries prepared in Examples 1 to 4 and Comparative Examples 1 and 2 were constant current/constant voltage charged with a constant current at a rate of 0.1 C until a voltage was 4.5 V (vs. Li), and discharged with a constant current at a rate of 0.1 C until a voltage was 3 V (vs. Li) at 25° C. (A formation process)

The lithium batteries after the formation process were constant current/constant voltage charged with a constant current at a rate of 1 C until a voltage was 4.5 V (vs. Li), and discharged with a constant current at a rate of 1 C until a voltage was 3 V (vs. Li) at 25° C. Such charging/discharging characteristic test was performed up to the 50$^{th}$ cycle.

Figure 3:
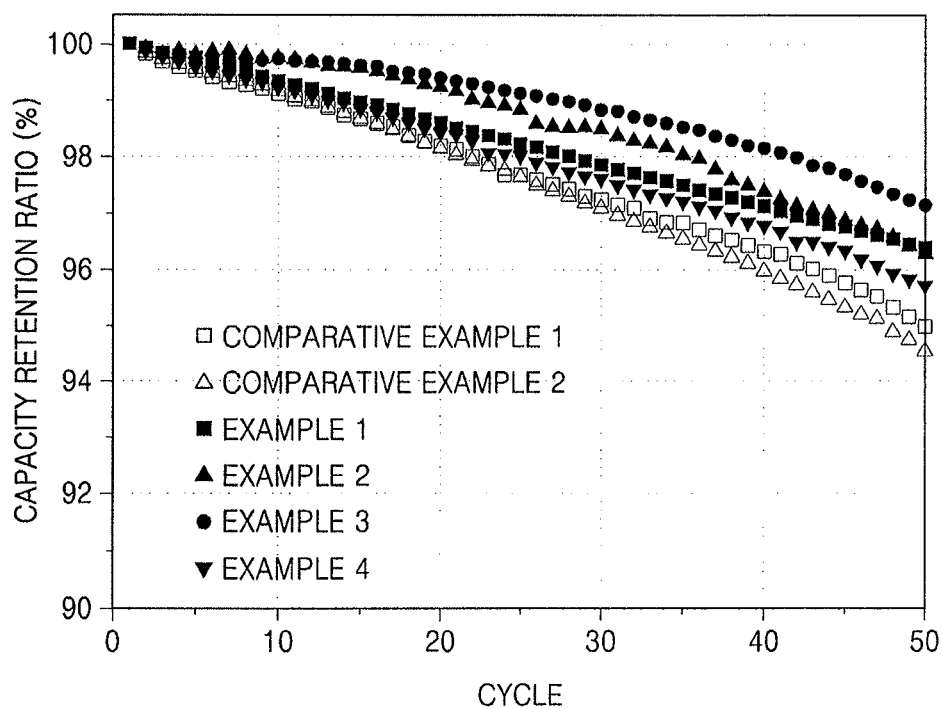
FIG. 3 illustrates the measured results of capacity retention ratios (CRR) per cycle of lithium batteries prepared in Examples 1 to 4 and Comparative Examples 1 and 2.

Capacity retention ratios (CRRs) of the lithium batteries prepared in Examples 1 to 4 and Comparative Examples 1 and 2 are shown in FIG. 3. The CRR is defined as shown in Equation 1.

CRR [%]=[Discharge capacity at each cycle/discharge capacity at 1$^{st}$ cycle]×100   <Equation 1>

As shown in FIG. 3, the LCO coated with LiNaSO$_4$ (Examples 1 to 4) exhibited an improved capacity retention ratio per cycle in general, compared to the LCO that was not coated with LiNaSO$_4$ (Comparative Example 1). In addition, in the case where a coating amount of LiNaSO$_4$ was low (Comparative Example 2), the capacity retention ratio may also low.

As described above, according to one or more embodiments, the positive active material providing improved lifespan characteristics of a lithium battery may be obtained by coating or blending the positive active material with LiNaSO$_4$.

By way of summation and review, as a positive active material for the lithium secondary battery, a single-component lithium cobalt oxide (LiCoO$_2$) has been mainly used. Studies on improvement of LiCoO$_2$ performance and development of an alternative material such as a 3-component-based material or an olivine-based material have been actively conducted due to capacity limitation and safety issues regarding LiCoO2.

In particular, a 3-component-based lithium metal oxide, Li(Ni$_x$Co$_y$Mn$_{1-x-y}$)O$_2$, has combined advantages of the high capacity of LiNiO$_2$, the stable electrochemical characteristics of LiCoO$_2$, and the thermal stability of Mn in LiMnO$_2$, and thus exhibits excellent electrochemical properties while having a relatively low cost.

However, with the 3-component-based material with high capacity, a large amount of lithium may be deintercalated during a charging process and thus, the 3-component-based material may have an unstable structure. Capacity deterioration may occur after charging and discharging. Also, the 3-component-based material may have issues of thermal stability due to a reaction with an electrolyte solution, and thus improvements in these regards are desirable. A positive active material that improves electrochemical characteristics of a lithium secondary battery by blocking a reaction between the positive active material and the electrolyte solution during charging/discharging cycles of lithium is desirable.

Embodiments provide a positive active material that improves lifespan characteristics of a lithium battery. Embodiments further provide a lithium battery including the positive active material and a method of manufacturing the positive active material. A positive active material may improve lifespan characteristics of a lithium battery by including a coating of LiNaSO$_4$ on a surface of a core that includes a compound capable of reversibly intercalating and deintercalating lithium or by blending the core with LiNaSO$_4$.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A method of manufacturing a positive active material, the method comprising:
   preparing a compound capable of reversibly intercalating and deintercalating lithium;
   adding and mixing a sodium source and a sulfate source to the compound to obtain a powder mixture; and
   heat-treating the powder mixture at a temperature in a range of about 600° C. to about 1,000° C. to obtain a positive active material including LiNaSO$_4$ that is coated on at least a part of a surface of the compound capable of reversibly intercalating and deintercalating lithium or that blends with the compound capable of reversibly intercalating and deintercalating lithium.

2. The method as claimed in claim 1, wherein the sodium source includes at least one selected from sodium dodecyl sulfate (CH$_3$(CH$_2$)$_{11}$SO$_4$Na), sodium sulfate (Na$_2$SO$_4$), sodium nitrate (NaNO$_3$), sodium acetate (CH$_3$COONa), sodium carbonate (Na$_2$CO$_3$), sodium bicarbonate (NaHCO$_3$), and sodium hydroxide (NaOH).

3. The method as claimed in claim 1, wherein the sulfate source includes at least one selected from sodium dodecyl sulfate ($CH_3(CH_2)_{11}SO_4Na$), sodium sulfate ($Na_2SO_4$), sulfuric acid ($H_2SO_4$), ammonium sulfate (($NH_4)_2SO_4$), and lithium sulfate ($Li_2SO_4$).

4. The method as claimed in claim 1, wherein:
an amount of the compound capable of intercalating and deintercalating lithium is in a range of about 95 wt % to about 99.5 wt % of a total weight of the compound capable of intercalating and deintercalating lithium and the $LiNaSO_4$, and
an amount of the $LiNaSO_4$ is in a range of about 0.5 wt % to about 5 wt % of the total weight of the compound capable of intercalating and deintercalating lithium and the $LiNaSO_4$.

5. A method of manufacturing a positive active material, the method comprising:
preparing a compound capable of reversibly intercalating and deintercalating lithium;
adding and mixing a sodium source and a sulfate source to the compound to obtain a powder mixture; and
heat-treating the powder mixture to obtain a positive active material including $LiNaSO_4$ that is coated on at least a part of a surface of the compound capable of reversibly intercalating and deintercalating lithium or that blends with the compound capable of reversibly intercalating and deintercalating lithium,
wherein an amount of the $LiNaSO_4$ is in a range of about 0.5 wt % to about 5 wt % of the total weight of the compound capable of intercalating and deintercalating lithium and the $LiNaSO_4$.

6. A method of manufacturing a positive active material, the method comprising:
preparing a compound capable of reversibly intercalating and deintercalating lithium;
adding and mixing a sodium source and a sulfate source to the compound to obtain a powder mixture; and
heat-treating the powder mixture to obtain a positive active material including $LiNaSO_4$ that is coated on at least a part of a surface of the compound capable of reversibly intercalating and deintercalating lithium or that blends with the compound capable of reversibly intercalating and deintercalating lithium, wherein:
an amount of the compound capable of intercalating and deintercalating lithium is in a range of about 95 wt % to about 99.5 wt % of a total weight of the compound capable of intercalating and deintercalating lithium and the $LiNaSO_4$, and
an amount of the $LiNaSO_4$ is in a range of about 0.5 wt % to about 5 wt % of the total weight of the compound capable of intercalating and deintercalating lithium and the $LiNaSO_4$.

* * * * *